United States Patent [19]

Greer

[11] Patent Number: 4,724,670
[45] Date of Patent: Feb. 16, 1988

[54] TURBINE ENGINE

[75] Inventor: David Greer, Youngstown, Ohio

[73] Assignee: Josie M. Greer, administratrix, Youngstown, Ohio

[21] Appl. No.: 684,851

[22] Filed: Dec. 17, 1984

Related U.S. Application Data

[63] Continuation-in-part of Ser. No. 456,467, Jan. 7, 1983, abandoned.

[51] Int. Cl.⁴ ............................................. F02C 3/14
[52] U.S. Cl. ............................... 60/39.162; 60/39.35; 60/39.465; 415/77
[58] Field of Search .................. 60/39.35, 39.34, 39.37, 60/39.162, 744, 268, 39.465, 39.19; 415/77

[56] References Cited

U.S. PATENT DOCUMENTS

| | | | |
|---|---|---|---|
| 1,960,810 | 5/1934 | Gordon | 60/39.35 |
| 2,289,900 | 7/1942 | Braga | 60/39.35 |
| 2,477,798 | 8/1949 | Griffith | 60/39.162 |
| 2,592,938 | 4/1952 | McNaught | 60/39.35 |
| 2,612,022 | 9/1952 | Keys | 60/39.35 |
| 2,836,958 | 6/1958 | Ward, III | 60/39.35 |
| 3,525,214 | 8/1970 | Demo | 60/39.37 |

FOREIGN PATENT DOCUMENTS 471671 9/1937 United Kingdom ............... 60/39.35

Primary Examiner—Louis J. Casaregola
Assistant Examiner—Donald E. Stout
Attorney, Agent, or Firm—Cullen, Sloman, Cantor, Grauer, Scott, & Rutherford

[57] ABSTRACT

A turbine engine includes an elongated motor having a power source and a drive shaft. A first compressor connected to a fuel inlet, and a second compressor having an air inlet are coaxially mounted for rotation upon the motor. An elongated casing for the second compressor terminates in an intermediate casing which defines a pair of diffuser chambers, and terminates in a turbine casing having a converging exhaust outlet. Pressurized high velocity vaporized fuel and compressed air are delivered into the diffuser chambers and through a plurality of fuel injectors to continuously feed air and combustible fuel into an elongated combustion chamber member which is rotatably mounted within the turbine casing. One end of the combustion chamber member extends into and is journaled upon the intermediate casing. A speed up gear train interconnects the motor shaft with an engine shaft which is journaled through the intermediate and turbine casings and extends through the combustion chamber member to the turbine casing outlet. A plurality of turbines secured to the engine shaft are rotatably mounted within the turbine casing outwardly of the combustion chamber and receive the high velocity exhaust gases from the combustion chamber and are rotatably driven thereby. Electronic ignition rods for the combustible mixture within the combustion chamber are connected to a suitable electrical power source. Interconnected gearing upon the engine shaft and the combustion chamber member provide continuous rotation of the combustion chamber.

12 Claims, 4 Drawing Figures

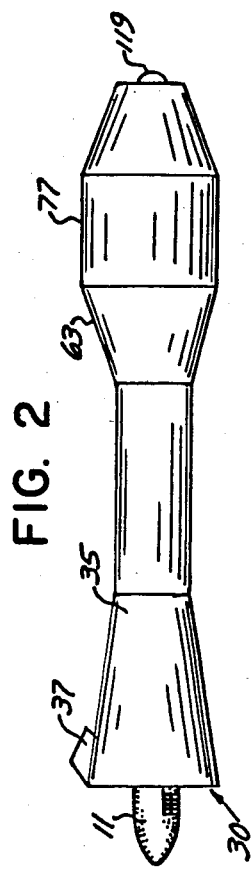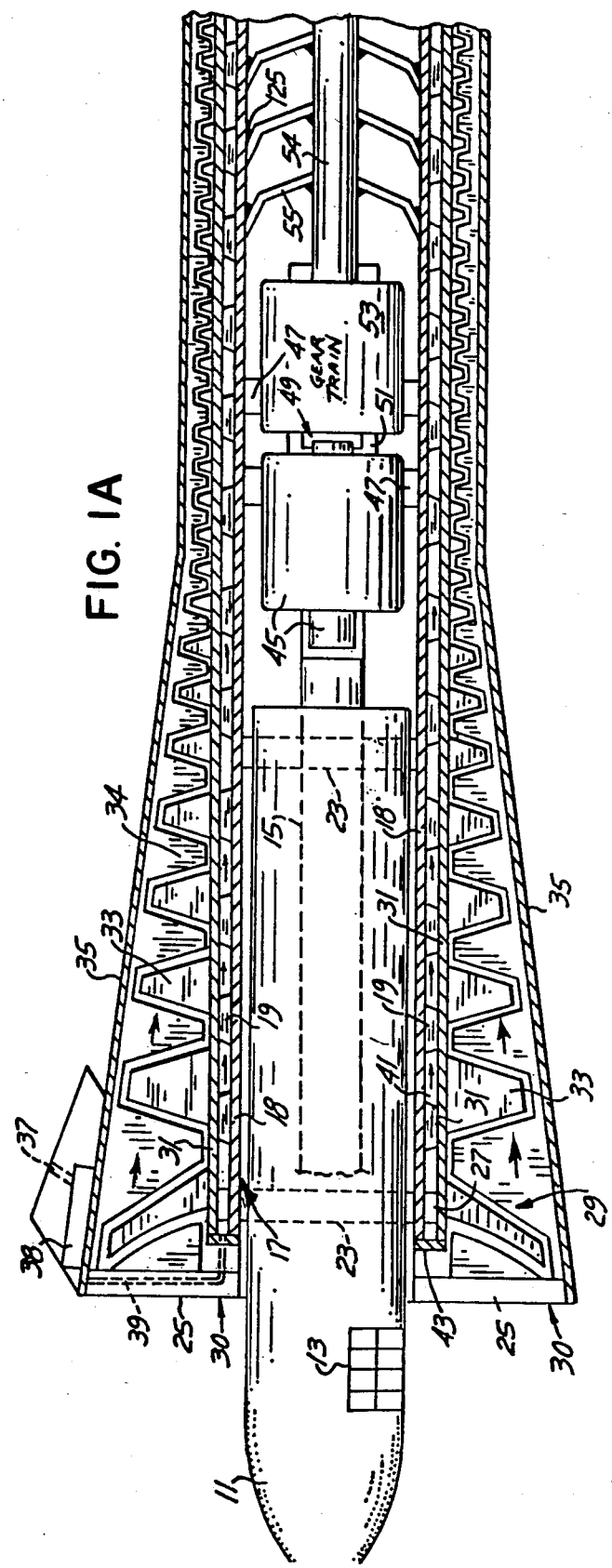

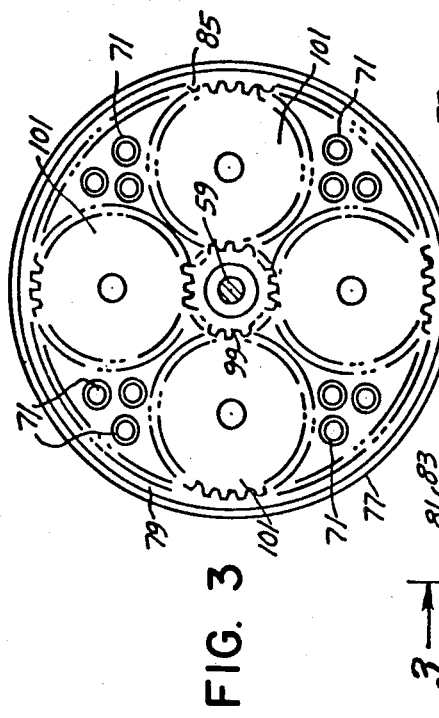

TURBINE ENGINE

RELATED APPLICATION

This application is a Continuation-In-Part of copending application Ser. No. 456,467 filed Jan. 7, 1983, now abandoned, for a Turbine Engine.

BACKGROUND OF THE INVENTION

Turbine engines have heretofore been motor driven normally employ fuel and air compressors for delivering a combustible mixture to a combustion chamber in a casing having a converging outlet for driving a plurality of turbines coaxially mounted therein for receiving high velocity exhaust gases and for providing forward thrust. Heretofore it is known in the construction of turbine engines there is provided a main drive shaft which extends axially of the turbine which is adapted to effect a power drive for the fuel and air compressors to provide a combustible mixture and for forcefully feeding the same into a combustion chamber together with suitable ignition means and wherein the products of combustion move a high velocity through a plurality of turbines within the engine casing through a converging outlet therefore for the production of forward thrust.

SUMMARY OF THE INVENTION

An important feature of the present invention is to provide a turbine engine which includes an elongated motor having an axial drive shaft wherein fuel and air compressors are concentrically mounted and journaled upon the motor delivering high velocity vaporized fuel and compressed air into diffuser chambers.

A further feature includes concentric casings for the respective compressors, each of which include an elongated tubular vaned member for delivering pressurized vaporized fuel and compressed air into said diffuser chamber.

A further feature includes an outer casing for the air compressor mounted and supported upon the motor coaxially thereof and with the casing at one end adjacent the outlet ends of the compressors terminating in a diverging intermediate casing defining therein diffuser chambers for receiving the pressurized fuel and air.

A further feature includes a pair of spaced partitions transversely within the intermediate casing to further define the diffuser chambers through which the pressurized fuel and compressed air are delivered and wherein a plurality of tubular injectors mounted upon the intermediate casing and extend thereinto with portions of the injectors projecting longitudinally into a rotary combusion chamber journaled and supported within and upon the intermediate casing and the turbine casing. Some of the injectors feed pressurized fuel and some feed pressurized air to a combustion chamber.

A further feature includes a rotative hollow combustion chamber which is axially positioned within the intermediate casing and turbine casing and exteriorly journaled thereon and wherein the combustion chamber is continuously rotatable.

A further feature provides a gear mechanism including drive gear upon an engine shaft axially connected to the motor drive shaft which is connected by intermeshing gears with an internal ring gear upon the interior of the combustion chamber rotatable driving the same.

A further feature provides for continuous electronic ignition through igniter rods which are mounted and positioned within the combustion chamber for the continuous ignition of the combustible mixture therein, for the delivery of high velocity exhaust gases outwardly of the combustion chamber through a plurality of turbines within a turbine chamber for impingement thereon and for power rotation of some of the turbines for delivering exhaust gases at high velocity through the converging outlet of the turbine casing for providing forward thrust.

A further feature incorporates the mounting of some of the turbines within the turbine casing so as to be axially connected to the engine shaft providing additional torque thereto.

A further feature contemplates a speed up gear train power transmission assembly positioned within the inner compressor tube connected to the motor shaft and which includes an output engine shaft supported and journaled through the intermediate casing and which extends through the turbine casing to the outlet thereof and which extends axially through the power rotated combusion chamber.

A further feature includes a drive gear upon the engine shaft and an internal ring gear upon the combustion chamber peripherally thereof and at one end together with a series of intermeshing, intermediate idler gears interconnecting the drive gear and the ring gear for providing continuous rotation of the combustion chamber.

A further feature includes the provision of an annular cooling chamber within the turbine casing outwardly of the combustion chamber together with a pressurized coolant delivered into said chamber for providing continuous cooling for the rotative combustion chamber.

A further feature includes a converging throated outlet for the combustion chamber for increasing the velocity of the exhausting gases from the combustion chamber and for forceful impingement upon the plurality of turbines nested and supported within the turbine casing some of which are axially connected to the engine shaft for providing torque thereto.

These and other objects and features will be seen from the following specification and claims in conjunction with the appended drawings.

DESCRIPTION OF THE DRAWINGS

FIG. 1A-1B is a multiple part longitudinal section of the present turbine engine.

FIG. 2 is a side elevational view of the turbine engine on a reduced scale, being an assembly of the parts shown in FIGS. 1A-1B.

FIG. 3 is a fragmentary cross-section taken in the direction of arrows 3—3 of FIG. 1B.

It would be understood that the above drawings illustrate merely a preferred embodiment of the invention, and that other embodiments are contemplated within the scope of the claims hereafter set forth.

DETAILED DESCRIPTION OF AN EMBODIMENT OF THE INVENTION

Referring to the drawings of FIGS. 1A and 1B, 2 and 3 the present turbine engine shown in assembly in FIG. 2 and in parts in FIGS. 1A and 1B, includes an elongated cylindrical motor 11 having a plurality of terminal power connectors 13, as in the case of an electric motor, and including an axial drive shaft 15. It is contemplated that power means for the motor may be other than electric such as a jet engine or the like for the purpose of delivering rotative drive to the shaft 15.

A first inner compressor 17, sometimes referred to as a fuel compressor, includes an elongated compressor tube 18 having a plurality of spaced vanes 19 along its length rotatable with the inner casing 31.

The compressor tube 18, sometimes referred to as a first compressor tube, extends along the length of the motor 11 and rearwardly thereof and is supportably journaled thereon by a pair of spaced bearings 23.

Mounted upon a pair of longitudinally spaced spacers 27 concentric with bearings 23 is an elongated compressor tube or inner casing 31, sometimes referred to as the second compressor tube. Said tube forms a part of the second or outer compressor 29, sometimes referred to as an air compressor, having an air inlet 30 at the forward end thereof and enclosed by the axial outer casing 35. Said casing is coaxial of and surrounds the first compressor casing 31, and is secured to the motor 11 at its forward end by the tubular front brace supports 25. Compressor 29 includes blades 33 secured to tube 31 and rotatable between formed vanes 34 upon the interior of casing 35.

Mounted upon a forward portion of outer casing 35 forming a part of the second compressor 29 and bracing 25 is a fuel pump 38 joined to a fuel inlet 37 connected to a suitable storage tank of fuel. A part of the bracing 25 includes a plurality of conduits 39 to deliver fuel to the interior of casing 31.

As shown in FIG. 1A, between the compressor casing 31 and the power rotated compressor tube 18 there is an elongated fuel chamber 41 through which the pressurized fuel passes along the length of the inner compressor.

Suitable coupling plates 43 are provided which interconnect the forward ends of the respective first and second compressor tubes 18 and 31 so that said compressor tubes are adapted for rotation in unison. Axial coupling 45 to drive shaft 15 is journaled forwardly upon bearing 47 within the inner compressor tube 18.

The coupling member 45 at its forward end extends into the coupling 49 axially connecting drive shaft 51 for the first speed up gear train 53, schematically shown, axially journaled at 47 upon the interior of the inner compressor tube 18. The first gear train assembly 53 has an output shaft 54 which extends into the second speed up gear train assembly 57, FIG. 1B, schematically shown. Gear train 57 is journaled at 58 within tube 18 of compressor 17. The drive shaft 54 of gear train 53 is adapted to rotate the inner compressor tube 18 simultaneously, and concentrically thereof the outer compressor tube 31. The output of the second gear train assembly includes engine shaft 59 which is supportably journaled through the bearing 61 within an end portion of casing 35. The drive connection between shaft 54 and tube 18 includes a series of braces 55 centrally anchored to shaft 54 and peripherally connected as at 125 to the interior of tube 18, FIG. 1A.

The rearward end of the compressor casing 35 terminates in the outwardly diverging intermediate casing 63 which contains a pair of longitudinally spaced apertured partitions 65 and 67 and conical partition 68 defining therebetween the diffuser chambers 69 and 70. Said chambers are adapted to receive pressurized fuel and compressed air from the fuel and air compressors. The inner chamber 70 receives pressurized fuel, and the outer chamber 69 receives pressurized air.

A plurality of parallel tubular injectors 71 are mounted upon partition 67 within the intermediate casing 63 and extend outwardly into the elongated generally cylindrical turbine casing 77 which at its rear end has a converging exhaust outlet 75. The outer circle of injectors receive pressurized air from chamber 69 and the inner circle of injectors receive pressurized fuel from chamber 70 as shown by the arrows, FIG. 1B.

Elongated rotatable combustion chamber 73 includes a cylindrical body 79, circular in cross-section but of varying dimensions along its length, which has a tapered drive portion 81 which extends forwardly into a portion of the intermediate casing 63 and is supported and journaled thereon by a pair of bearings 83 upon the interior of the intermediate casing. Mounted upon the interior of the rotatable combustion chamber 73 at its forward end portion is an internal ring drive gear 85.

Stationary electrode mount plate 87 is suitably anchored as at 89 to plate 67 and supports and mounts a plurality of parallel spaced electronic igniter rods 91 which are connected to a suitable high voltage electrical power source 92 schematically shown. In the preferred embodiment there are four rods 91.

A plurality of transverse apertures 93 extend through the respective igniter rods which when energized will become incandescent to provide a continuous ignition for the combustible mixture of vaporized fuel and compressed air within rotating combustion chamber 73. Pressurized air and fuel are indepenently fed through the fuel injectors 71 into the fire chamber 95 defined within said combustion chamber. Rotation of the combustion chamber body 79 mixes the streams of pressurized air and fuel into a highly combustible mixture.

Rearward portions of the combustion chamber 73 are progressively converging and of reduced diameter as at 97 to form a throated outlet for the combustion chamber for increasing the velocity of movement of the exhaust gases passing outwardly of the combustion chamber towards the turbine outlet 75.

There is provided one means by which the engine shaft 59 effects continuous rotation of the combustion chamber 73. Drive pinion 99 upon the engine shaft 59, as shown in FIG. 3, is in mesh with a plurality of intermediate gears 101 in turn in mesh with the peripheral ring gear 85.

The rearward tapered converging end 98 of the combustion chamber 73 is supportably journaled upon the bearings 103 upon the interior of turbine casing 77.

Axially positioned within the rotative combustion chamber 73 is an elongate outwardly tapered drive tube 105 which extends lengthwise of the combustion chamber 73 and rearwardly thereof is connected thereto by a plurality of braces 106. Tube 105 defines a central wall for combustion chamber 73. Tube 105 is rotatably positioned within the turbine casing 77 axially journaled at 108 upon the engine shaft 59 for rotation with the combustion chamber. Tube 127 is journaled upon shaft 59 with roller bearings 129 interposed. Tube 127 is also journaled at its opposite ends within tubular support 131 with roller bearings interposed. Support 131 is connected at its ends to the rotatable combustion chamber 73.

Turbine 107 is journaled upon tube 127 for rotation in one direction, such as counter-clockwise. The second turbine 109 is axially journaled and supported within combustion chamber outlet 98 upon tube 127 and is peripherally connected at 133 to turbine 107 for rotation therewith in the same direction.

Turbines 107 and 109 rotate in the same direction as combustion chamber 73. The respective additional turbines 113, 114, 115 and 117 are further rotatably mounted and supported upon the interior of the turbine casing 77 and are axially keyed at 135 to engine shaft 59. Turbines 113, 114, 115 and 117 rotate in a direction opposite turbines 107, 109, such as clockwise. The outermost turbine 117 has a central cone 119 attached thereto positioned axially of the casing outlet 75 through which the high velocity exhaust gases pass providing forward thrust to casing 77. Apertured spider 137 is peripherally anchored at 139 within outlet 75 of casing 77. Said spinder centrally mounts bearing 140 supportably journaling the end of shaft 59.

In operation, the turbines 113, 114, 115 and 117 by their axial connection to the engine shaft 59 and due to the rotative forces applied thereto by the high velocity escaping products of combustion provide an additional drive torque to the engine shaft 59 augmenting its power rotation and for increasing the speed of rotation thereof, and for reducing the amount of power needed for driving the engine shaft 59.

Schematically in FIG. 1B there is shown a source of pressurized coolant 121, preferably liquid, and which is connected by a suitable conduit 122 to the annular coolant chamber 123 within the casing 77 and outwardly of the combustion chamber during operation of the present turbine engine.

The respective vanes or blades of the turbines are arranged at diferent angles so as to achieve different thrust upon repective turbines for the handling of the high velocity exhaust gases flowing outwardly of the fire chamber 95 from combustion chamber 73 outwardly and through the respective turbines 107, 109, 111, 113, 114, 115 and 117 outwardly of the outlet 75.

The coolant above described with respect to element 121 may be in the nature of the pump or peripheral inlet around the intermediate casing 63 providing continuous flow of coolant liquid or air into the chamber 123 on longitudinal forward movement of the turbine engine.

Having described my invention, reference should now be had to the following claims:

I claim:

1. In a turbine propulsion engine, an elongated motor including a power means and having a drive shaft projecting therefrom;
   a first compressor including an elongated rotatable first casing coaxially mounted upon said motor having a fuel inlet for pressure feeding of fuel lengthwise of said first compressor;
   a second compressor including a casing coaxially mounted upon and along said first compressor casing secured to said motor having an air inlet at its forward end for feeding high velocity compressed air lengthwise of said second compressor casing;
   an intermediate diverging casing at one end peripherally connected to said second compressor casing having inner and outer diffusor chambers communicating respectively with said compressors for receiving high velocity vaporized fuel and compressed air;
   a turbine casing at one end peripherally connected to said intermediate casing and at its other end having a converging exhaust outlet;
   an elongated combustion chamber of circular cross-section rotatably mounted and spaced within and journaled upon said turbine casing;
   an engine shaft extending axially through said combustion chamber, journaled upon said turbine casing and axially connected to said drive shaft;
   a plurality of fuel injectors mounted within said diverging casing extending into said diffusor chambers respectively and outletting into said combustion chamber;
   an electronic fuel ignition means within said combustion chamber and connected to an electrical power source;
   means connecting said first compressor first casing to said drive shaft;
   a plurality of turbines longitudinally of said combustion chamber rotatably journaled within said turbine casing and coaxially mounted upon said engine shaft and connected thereto for the high velocity exiting of the products of combustion through said outlet, rotating said turbines and for applying torque to said engine shaft;
   said combustion chamber outletting axially into said turbines;
   the combustion chamber converging adjacent said turbines providing a throated outlet substantially enclosing said turbines for increasing velocity of the exhaust gases impinging upon said turbines;
   and gear drive means interconnecting said engine shaft and said combustion chamber, high velocity of products of combustion passing reactively through the outlet of said turbine casing providing forward thrust to said turbine engine and said casings.

2. In the turbine engine of claim 1, said diffusor chambers being defined by a pair of spaced transverse partitions and a conical partition within said intermediate casing.

3. In the turbine engine of claim 1, said first compressor including an elongated first compressor tube within said first casing journaled upon said motor having a plurality of spaced external radial vanes, and connected to said drive shaft;
   said second compressor including a plurality of spaced external blades upon said first casing rotating within said second compressor casing for feeding high velocity compressed air lengthwise thereof;
   and means connecting said first casing and first compressor tube for rotation in unison;
   said first compressor tube and first casing and the second compressor casing extending to said intermediate casing and outletting into said diffusor chambers respectively for continuously feeding a high velocity vaporized fuel and compressed air into said combustion chamber.

4. In the turbine engine of claim 1, a main bearing within said intermediate casing, said engine shaft adjacent one end journaled through said main bearing;
   and at its other end journaled upon said turbine casing;
   said ignition means including a plurality of spaced electronic ignition rods mounted within and extending along the length of said combustion chamber.

5. In the turbine engine of claim 1, said gear drive means including a drive gear upon said engine shaft;
   a ring gear upon the interior of said combustion chamber;
   and a plurality of idler gears interconnecting said drive gear and ring gear.

6. In the turbine engine of claim 1, a speed up gear train transmission coaxial of said motor having an axial input shaft coupled with said motor drive shaft and to said engine shaft.

7. In the turbine engine of claim 3, the blades on said first casing nesting and rotatable within annular grooves within the second compressor casing.

8. In the turbine engine of claim 4, there being a plurality of transverse apertures through said ignition rods, said rods being rendered incandescent for continuous ignition and firing of said combustible mixture within said combustion chamber.

9. In the turbine engine of claim 1, the means connecting said first compressor casing to said drive shaft including a plurality of longitudinally spaced annular braces within said first tube peripherally secured thereto and axially connected to said drive shaft.

10. In the turbine engine of claim 1, an elongated support tube extending the length of said combustion chamber and axially rearward thereof journaled upon said engine shaft;

and a plurality of interconnected additional turbines within said turbine casing coaxially mounted upon said tube and journaled thereon, outwardly of said combustion chamber responding to said moving products of combustion and rotating in a direction opposite from said first mentioned turbines.

11. In the turbine engine of claim 3, said first compressor casing driving said second compressor.

12. In the turbine engine of claim 1, a main bearing within said intermediate casing, said engine shaft adjacent one end journaled through said main bearing;

and at its other end journaled upon said turbine casing;

said ignition means including a plurality of spaced electronic ignition rods mounted within and extending along the length of said combustion chamber;

said gear drive means including a drive gear upon said engine shaft;

a ring gear upon the interior of said combustion chamber;

and a plurality of idler gears interconnecting said drive gear and ring gear;

a speed up gear train transmission coaxial of said motor having an axial input shaft coupled with said motor drive shaft and to said engine shaft;

an elongated support tube extending the length of said combustion chamber and axially rearward thereof journaled upon said engine shaft;

and a plurality of interconnected additional turbines within said turbine casing coaxially mounted upon said tube and journaled thereon, outwardly of said combustion chamber responding to said moving products of combustion and rotating in a direction opposite from said first mentioned turbines.

* * * * *